US012756770B2

(12) United States Patent
Dandu et al.

(10) Patent No.: US 12,756,770 B2
(45) Date of Patent: Oct. 6, 2026

(54) PROVIDING A SYNCHRONIZATION LAYER FOR AUTO-GENERATING MULTI-PROTOCOL MAPPING STRUCTURES

(71) Applicant: Silicon Laboratories Inc., Austin, TX (US)

(72) Inventors: Bharat Raju Dandu, Boston, MA (US); Jean-Francois Penven, Montreal (CA); Marius Munder, Unna (DE)

(73) Assignee: Silicon Laboratories Inc., Austin, TX (US)

( * ) Notice: Subject to any disclaimer, the term of this patent is extended or adjusted under 35 U.S.C. 154(b) by 253 days.

(21) Appl. No.: 18/789,318

(22) Filed: Jul. 30, 2024

(65) Prior Publication Data

US 2026/0039725 A1 Feb. 5, 2026

(51) Int. Cl.
*H04L 69/08* (2022.01)
*G16Y 40/35* (2020.01)
*H04L 67/12* (2022.01)

(52) U.S. Cl.
CPC .............. *H04L 69/08* (2013.01); *G16Y 40/35* (2020.01); *H04L 67/12* (2013.01)

(58) Field of Classification Search
None
See application file for complete search history.

(56) References Cited

U.S. PATENT DOCUMENTS 11,122,151 B2 * 9/2021 Tessiore ................ H04L 67/565
2003/0157938 A1 * 8/2003 Haase ..................... H04W 8/18 455/445
2004/0052273 A1 * 3/2004 Karaoguz ........... H04L 12/2856 709/200
2008/0273486 A1 * 11/2008 Pratt ....................... H04L 67/52 370/328
2018/0121535 A1 * 5/2018 Oberhofer ............. G06F 16/215
2019/0150134 A1 * 5/2019 Kakinada .............. H04W 16/14 370/330

(Continued)

FOREIGN PATENT DOCUMENTS

CN 1585379 A * 2/2005
CN 101277293 B * 5/2011
CN 102629205 B * 3/2015

(Continued)

OTHER PUBLICATIONS

NXP, ZigBee Cluster Library (for ZigBee 3.0) User Guide, Rev. 1.5, Sep. 14, 2018, pp. 1-1390.

(Continued)

*Primary Examiner* — Ayaz R Sheikh
(74) *Attorney, Agent, or Firm* — Trop, Pruner & Hu, P.C.

(57) ABSTRACT

In an embodiment, a method includes: for a first endpoint of a first wireless protocol and a first endpoint of a second wireless protocol, identifying a plurality of common clusters and a plurality of common attributes; generating a synchronization (sync) layer based at least in part on the plurality of common clusters and the plurality of common attributes; and storing the sync layer as a multi-protocol file in at least one non-transitory storage medium, which is accessible to a configuration tool, to enable devices to be configured with a mapping table based at least in part on the sync layer.

20 Claims, 6 Drawing Sheets

(56) References Cited

U.S. PATENT DOCUMENTS

2020/0177517 A1* 6/2020 Pancras .................. H04W 4/70

FOREIGN PATENT DOCUMENTS

| | | | | | |
|---|---|---|---|---|---|
| CN | 108123946 | A | * | 6/2018 | ............. H04L 69/08 |
| CN | 113015145 | B | * | 4/2023 | ............. H04L 69/18 |
| CN | 117596138 | A | * | 2/2024 | ......... H04L 41/0803 |
| CN | 114006928 | B | * | 4/2024 | ............. H04L 67/12 |
| CN | 121814632 | A | * | 4/2026 | |
| JP | 2003198590 | A | * | 7/2003 | |
| WO | WO-03013104 | A1 | * | 2/2003 | ............. H04L 69/18 |
| WO | WO-2004028057 | A2 | * | 4/2004 | ........... H04L 69/324 |

OTHER PUBLICATIONS

Silicon Labs, AN1418: Running Zigbee, OpenThread, and Bluetooth® Concurrently on a System-on-Chip, Rev. 0.2, 2023, pp. 1-19.
Silicon Labs, AN1325: ZCL Advanced Platform (ZAP) User's Guide, Rev. 0.4, 2023, pp. 1-15.
Guibene, U.S. Appl. No. 18/732,504, filed Jun. 3, 2024, entitled "System, Method And Apparatus To Enable Wake-Up On Trigger In A Mesh Network," pp. 1-28.

* cited by examiner

PROVIDING A SYNCHRONIZATION LAYER FOR AUTO-GENERATING MULTI-PROTOCOL MAPPING STRUCTURES

BACKGROUND

As wireless devices such as Internet of Things (IoT) devices proliferate throughout today's society, an increasing number of wireless protocols have been introduced via which these devices may communicate. In mesh networks, for example, wireless communications may be according to multiple protocols including Matter, Zigbee, Thread, and Sidewalk, among others.

Certain IoT devices may communicate according to multiple one of these or other protocols. It becomes challenging to maintain synchronization between states and attributes of these devices in the different protocols, particularly where the devices may communicate with and can be controlled by controllers of the different protocols. Current solutions require hardcoding mappings, and increase complexity while preventing flexibility.

SUMMARY OF THE INVENTION

In one aspect, a method includes: for a first endpoint of a first wireless protocol and a first endpoint of a second wireless protocol, identifying a plurality of common clusters and a plurality of common attributes; generating a synchronization (sync) layer based at least in part on the plurality of common clusters and the plurality of common attributes; and storing the sync layer as a multi-protocol file in at least one non-transitory storage medium. This non-transitory storage medium can be accessible to a configuration tool.

In an implementation, the method further comprises generating the sync layer comprising a plurality of entries, each of the entries comprising: a cluster identifier for a common cluster of the first wireless protocol and the second wireless protocol and, associated with the cluster identifier, a common code for the first wireless protocol and the second wireless protocol; and at least one attribute identifier for a common attribute of the first wireless protocol and the second wireless protocol and, associated with the at least one attribute identifier, a common code for the first wireless protocol and the second wireless protocol. The method may also include storing the multi-protocol file as a JavaScript Object Notation (json) file.

In an implementation, the method may also include generating the sync layer using the configuration tool based at least in part on an identification of a multi-protocol application for a wireless device to communicate using the first wireless protocol and the second wireless protocol. The method may also include accessing the multi-protocol file with the configuration tool and using the multi-protocol file to create a multi-protocol mapping table, the multi-protocol mapping table for causing one or more attributes of the first wireless protocol to be in synchronization with one or more corresponding attributes of the second wireless protocol during operation of the wireless device. Creating the multi-protocol mapping table may include auto-generating the multi-protocol mapping table in the configuration tool using the multi-protocol file.

In an implementation, the method further comprises associating the multi-protocol mapping table with device code of the wireless device. The method may also include storing the device code comprising the multi-protocol mapping table in a non-volatile storage medium of the wireless device.

In an implementation, the method further comprises in response to an update to a state of a first attribute of the first wireless protocol, synchronizing a state of a first attribute of the second wireless protocol to correspond to the updated state of the first attribute of the first wireless protocol using the multi-protocol mapping table. The method also includes communicating the update to the state of the first attribute of the second wireless protocol to a controller of the second wireless protocol according to an entry in a subscription database of the wireless device.

In another aspect, a computer readable storage medium includes instructions that when executed cause a system to perform a method comprising: for a first endpoint of a first wireless protocol and a first endpoint of a second wireless protocol, identifying a plurality of common clusters and a plurality of common attributes; generating a sync layer based at least in part on the plurality of common clusters and the plurality of common attributes; and storing the sync layer as a multi-protocol file in at least one non-transitory storage medium, the at least one non-transitory storage medium accessible to a configuration tool.

In an implementation, the method further comprises generating the sync layer comprising a plurality of entries, each of the entries comprising: a cluster identifier for a common cluster of the first wireless protocol and the second wireless protocol and, associated with the cluster identifier, a common code for the first wireless protocol and the second wireless protocol; and at least one attribute identifier for a common attribute of the first wireless protocol and the second wireless protocol and, associated with the at least one attribute identifier, a common code for the first wireless protocol and the second wireless protocol.

In an implementation, the method further comprises generating the sync layer using the configuration tool based at least in part on an identification of a multi-protocol application for a wireless device to communicate using the first wireless protocol and the second wireless protocol. The method may further include accessing the multi-protocol file with the configuration tool and using the multi-protocol file to create a multi-protocol mapping table, the multi-protocol mapping table for causing one or more attributes of the first wireless protocol to be in synchronization with one or more corresponding attributes of the second wireless protocol during operation of the wireless device. The method may also include auto-generating the multi-protocol mapping table in the configuration tool using the multi-protocol file.

In yet another aspect, a wireless device includes: at least one circuit to perform an operation under control of at least one of a first controller of a first wireless protocol and a second controller of a second wireless protocol; an integrated circuit coupled to the at least one circuit. The integrated circuit may include: at least one transceiver to communicate with the first controller via the first wireless protocol and the second controller via the second wireless protocol; a processor to execute instructions; and a non-volatile storage coupled to the processor. The non-volatile storage may store a multi-protocol mapping table that associates common clusters of the first wireless protocol and the second wireless protocol and common attributes of the first wireless protocol and the second wireless protocol. The multi-protocol mapping table may be auto-generated by a configurator.

In an implementation, the wireless device is to access the multi-protocol mapping table to identify a first attribute of the second wireless protocol to update based on an update to a corresponding first attribute of the first wireless protocol. The wireless device may further include a memory coupled to the non-volatile storage, the memory to store a subscription database. In response to the update to the first attribute of the second wireless protocol, the wireless device is to communicate a status update regarding the updated first attribute of the second wireless protocol to the second controller. The processor may execute an attribute change callback function to cause the status update regarding the updated first attribute of the second wireless protocol to be communicated to the second controller.

In an implementation, the at least one circuit comprises at least one light emitting diode, the processor to control the at least one light emitting diode in response to a command from the first controller.

DETAILED DESCRIPTION

In various embodiments, a synchronization (sync) layer is provided as part of a configuration tool or an extension thereto. With this sync layer, a user of the configuration tool, such as an engineer or developer creating a multi-protocol application for a wireless device can automatically generate a multi-protocol mapping table. In turn, this multi-protocol mapping table can be included as part of the code that is generated for inclusion in the wireless device to enable multi-protocol operation. More specifically, this mapping table can be used during operation to maintain synchronization between various entities of the multiple protocols, and provide corresponding status information to communicating devices such as controllers, to enable accurate status to be maintained for the various features within the multiple protocols.

Figure 1:
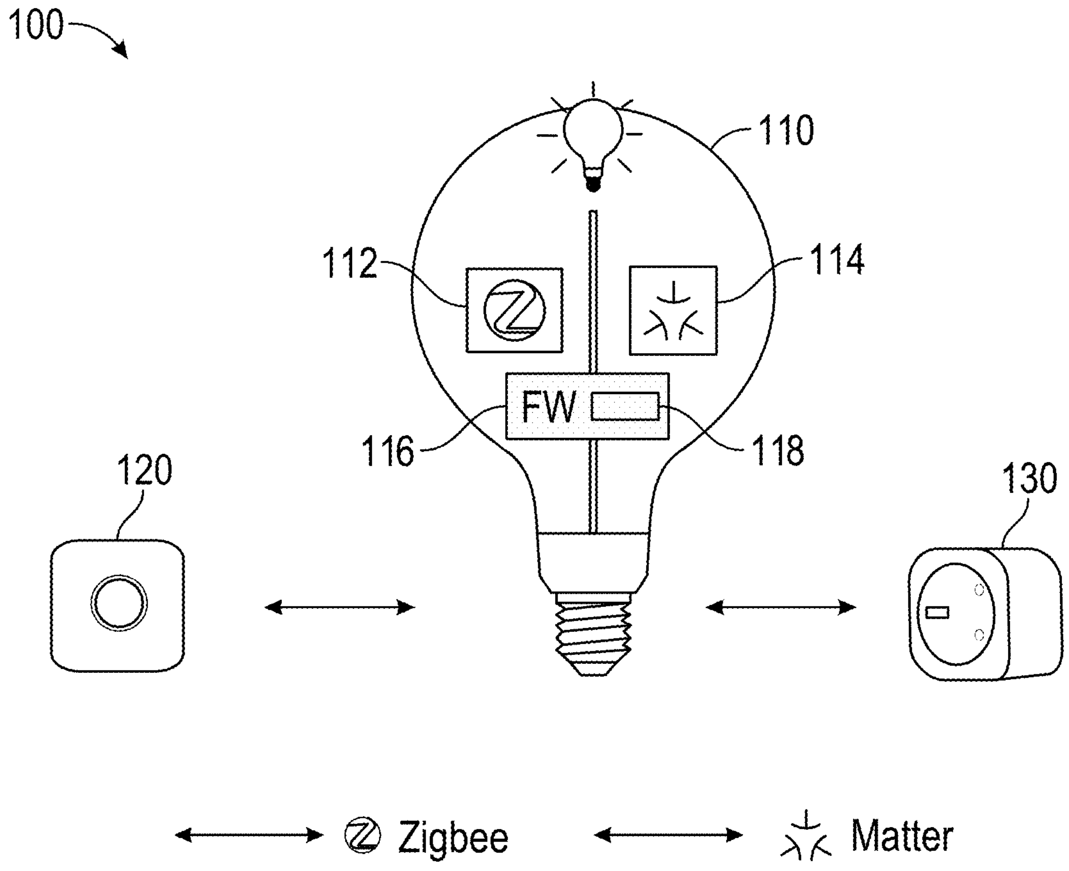
FIG. 1 is a block diagram of a network environment in accordance with an embodiment.

Referring now to FIG. 1, shown is a block diagram of a network environment in accordance with an embodiment. In the embodiment of FIG. 1, a wireless network 100 is implemented as a wireless personal area network (WPAN), piconet, mesh or other wireless networks. Understand that network 100 may include many more devices in communication, other than the few shown in FIG. 1.

As illustrated, a first device 110 is a smart lightbulb, which may include one or more light emitting diodes (LEDs) along with one or more integrated circuits (ICs) that control its operation. More particularly, smart bulb 110 may include a multi-protocol IC, e.g., which may be implemented as a system-on-chip (SoC) or other circuitry having multi-protocol wireless capability. Although embodiments are not limited in this regard, as examples, the SoC may provide for communication both within network 100 as well as within additional wireless networks, such as a wireless local area network (WLAN) according to a given IEEE802.11 (Wi-Fi) specification.

As further illustrated, smart bulb 110 includes wireless protocol stacks, namely, a Zigbee protocol stack 112 and a Matter protocol stack 114, and a firmware 116 which may include various device code. Understand that protocol stacks 112, 114 enable wireless communication (of the corresponding protocol) with other devices within network 110. Thus, as shown, Zigbee protocol stack 112 may communicate with a first controller 120, e.g., a light switch implemented as a Zigbee controller, which communicates with Zigbee protocol stack 112 via a Zigbee network. In turn, Matter protocol stack 114 may communicate with a second controller 130, e.g., a light switch implemented as a Matter controller, which communicates with Matter protocol stack 114 via a Matter network.

With this arrangement, either one of controllers 120, 130 may control operation of smart bulb 110, via the given protocol. Furthermore, by providing within smart bulb 110 a multi-protocol mapping table 118 in accordance with an embodiment, the state of various entities within smart bulb 110, e.g., cluster and attributes, can be maintained in synchronization. While mapping table 118 is shown as being included in firmware 116, understand that it can be separately stored in other embodiments. In order for device applications to function seamlessly under multi-protocol when maintaining separate endpoint configurations for Matter and Zigbee, the sync layer ensures that the corresponding attributes are always in sync and that the controllers of the device are notified about changes. Although shown at this high level in the embodiment of FIG. 1, understand that many more devices may be present in network 100.

Figure 2:
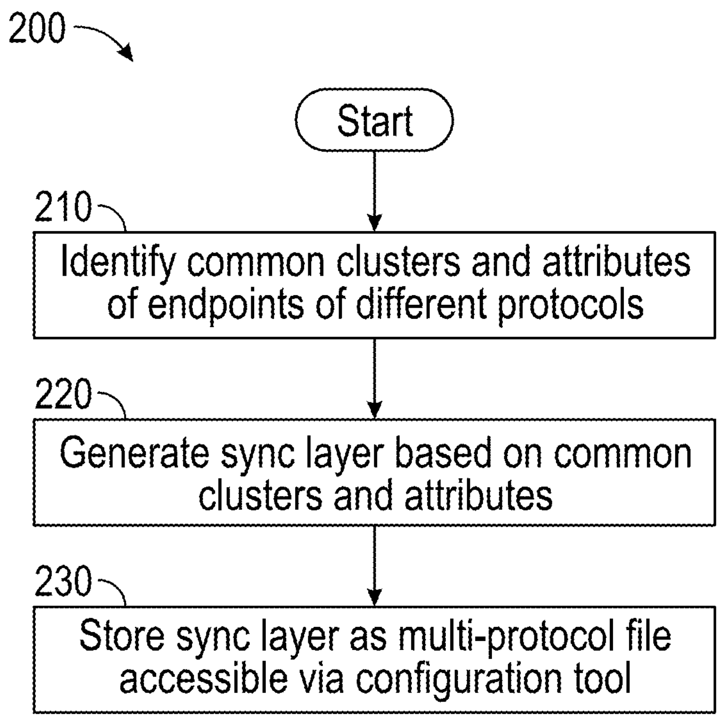
FIG. 2 is a flow diagram of a method in accordance with an embodiment.

Referring now to FIG. 2, shown is a flow diagram of a method in accordance with an embodiment. More specifically, method 200 in FIG. 2 is a method for generating a sync layer in accordance with an embodiment. As such, method 200 may be performed by one or more computing systems, such as a server of a device designer and/or manufacturer in developing a multi-protocol application for a device. Or the sync layer can be generated by a provider of a configuration tool. Understand that the configuration tool may be implemented as a set of configuration applications provided via a cloud-based platform that enables designers to develop applications, including multi-protocol applications as described herein for inclusion in wireless devices, such as IoT devices.

As shown in FIG. 2, method 200 begins by identifying common clusters and attributes of endpoints of the different protocols (block 210). For example, assume that this sync layer is for use in development of multi-protocol applications for devices having Zigbee and Matter functionality. Understand that this sync layer is used to establish a relationship between clusters and attributes of the different protocols. Thus, in block 210, at least one common cluster (and at least one common attribute of the cluster) may be identified for each common endpoint within the two protocols. Depending upon implementation, the identification of common clusters and attributes of the endpoints can be performed automatically by the configuration tool, or a user of the configuration tool may access information of the different protocols to identify commonality in endpoints, clusters and attributes.

In an embodiment, the configuration tool may be a Zigbee Cluster Configurator (ZCL) Advanced Platform (ZAP), which can be included in a suite of software tools that a silicon manufacturer provides to developers. With this configuration tool, a developer can manage Zigbee endpoints, clusters and commands implemented by their device. In an embodiment, ZAP works in concert with a Zigbee Application Framework to generate code for setting up the endpoints, clusters, attributes, and commands that constitute a Zigbee application. In an embodiment, ZAP can also be used for Matter configuration, and may be referred to in the Zigbee contexts as the ZCL.

Next, at block 220, a sync layer may be generated based on the common clusters and attributes. In an embodiment, this sync layer may be generated as a multi-protocol file, e.g., a JavaScript Object Notation (json) file, that can be included as part of a configuration tool or an extension thereto. Method 200 continues by storing this sync layer as the multi-protocol file that is accessible via the configuration tool (block 230).

In an embodiment, this sync layer can be used by ZAP to establish a relationship between multiple clusters, such that multi-protocol specific code can be auto-generated for common attributes. This generated sync/glue layer can be used by the functioning device types to keep the multi-protocol attributes in sync. More specifically, this generated code can be used to ensure that the Matter and Zigbee endpoint configurations are in sync for multi-protocol.

In embodiments, the Matter and Zigbee endpoint configurations may be maintained separate, and code is generated to sync the separate endpoint configurations, instead of creating a common endpoint configuration. In this way, embodiments may be more scalable as Zigbee and Matter specifications continue to evolve. Instead creating a common endpoint configuration could lead to complexity and difficulty to maintain over the long run as ZCL and Data-Model specifications continue to diverge.

Referring now to Table 1, shown is an example of a sync layer, implemented as a multi-protocol file.

TABLE 1

```
{
  “categories”: [“zigbee”, “matter”],
  “clusters”: [
    {
      “id”: 1,
      “matter”: {
        “code”: “0x006”,
        “manufacturerCode”:          null
      },
      “zigbee”: {
        “code”: “0x006”,
        “manufacturerCode”:          null
      },
      “attributes”: [
        {
          “id”: 1,
          “matter”: {
            “code”: “0x0000”,
            manufacturerCode”:          null
          },
          “zigbee”: {
            “code”: “0x0000”,
            “manufacturerCode”:          null
          }
        }
      ]
    },
    {
      “id”: 2,
      “matter”: {
        “code”: “0x0008”
        “ManufacturerCode”:          null
      },
      “zigbee”: {
        “code”: “0x0008”
        “manufacturerCode”:          null
      },
      “attributes”: [
        {
          “id”: 1,
          “matter”: {
            “code”: “0x00”,
            “manufacturerCode”:          null
          },
          “zigbee”: {
            “code”: “0x00”,
            “manufacturerCode”:          null
          }
        },
        {
          “id”: 2,
          “matter”: {
            “code”: “0x01”,
            “manufacturerCode”:          null
          },
          “zigbee”: {
            “code”: “0x01”,
            “manufacturerCode”:          null
          }
        }
      ]
    }
  ]
}
```

This sync layer helps to maintain the common attributes between the protocols in sync during device creation. The cluster IDs establish the cluster relationship and attribute IDs establish the attribute relationship. Thus as shown in Table 1, a sync layer can have multiple entries, each of which includes: a cluster identifier for a common cluster of the multiple protocols and, associated with the cluster identifier, a common code for the both of the protocols; and at least one attribute identifier for a common attribute of the multiple protocols and, associated with the at least one attribute identifier, a common code for both of the protocols.

Stated another way, each cluster is provided with the same code for both Matter and Zigbee, and includes attributes having common codes also (although different codes for clusters/attributes can be used in other embodiments). In embodiments, the configuration tool may validate the sync layer for correctness. For example, each Zigbee cluster ID should have a Matter ID and vice versa. The same validation can be applied for attributes as well, and the configuration tool may raise an error if this is not the case.

Note also that the sync layer need not be limited to clusters and attributes, and may include other features of a protocol's specification. In this way, the sync layer provides flexibility that can glue/link different parameters of an attribute from one protocol specification to another. In addition, the sync layer can handle specification changes, such as cluster and attribute IDs that can vary across Zigbee and Matter as their specifications continue to diverge. Also note that the sync layer is not limited to Zigbee and Matter specifications, and can be used to leverage customizations between custom attributes/clusters not defined by the Zigbee or Matter specifications. Users can create multi-protocol applications regardless of the limitations from a specification, thus linking custom attributes/cluster to a user's own specific use case.

Understand that while described herein as linking Zigbee and Matter, a sync layer can be a link to plural protocols where their clusters and attributes can be linked to each other. This means that the multi-protocol sync layer relationship cannot be established at load time of the configuration tool, unless the protocols are predefined. Taking scalability into account, assuming that user can select any of multiple protocols and make the application become multi-protocol. To realize this, the multi-protocol sync layer is established once the session has been created between the different protocols. If a user has created a multi-protocol application, the user can load the sync file as a ZCL extension.

Attribute values can be synced across Matter and Zigbee endpoints during application creation and device functionality during startup. A user defines a separate Matter and Zigbee endpoint with their own device types using the same endpoint ID. ZAP detects the common endpoint IDs that belong to different protocols, and uses the sync layer to ensure that the attribute values are the same during device initialization. ZAP also ensures that a change in a sync layer attribute on one endpoint also leads to a change in the corresponding attribute on the other endpoint, based on the sync layer relationship established by the multi-protocol sync layer file such as shown in Table 1 above.

The configuration tool can use this relationship to generate mapping code to be used by a functioning device to make sure that attributes across the protocols continue to be in sync when the device is in operation. Thus with this generated sync layer, a user can generate code for the device using the configuration tool having this multi-protocol file.

Figure 3:
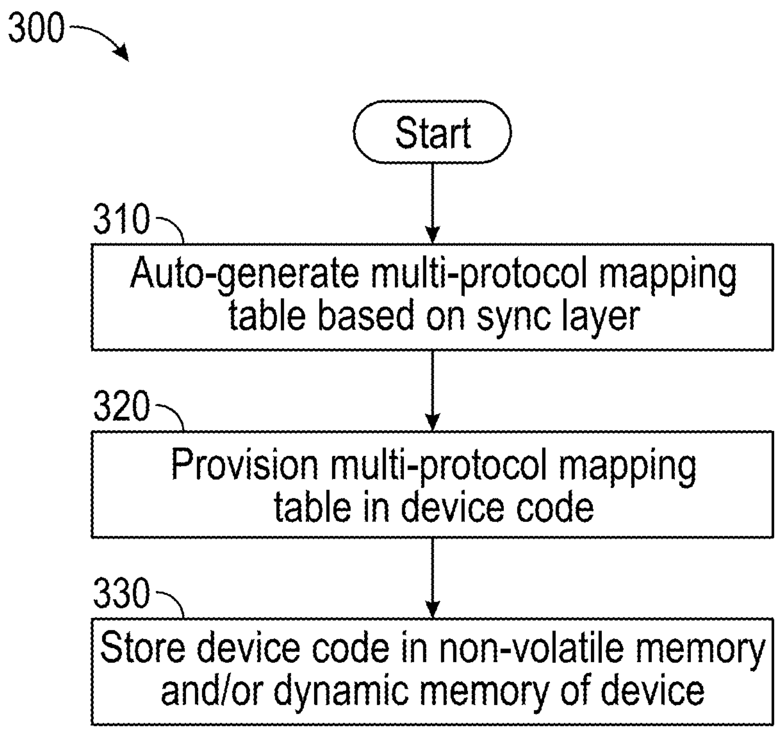
FIG. 3 is a flow diagram of a method for auto-generating a multi-protocol mapping table in accordance with an embodiment.

Referring now to FIG. 3, shown is a flow diagram of a method for auto-generating a multi-protocol mapping table in accordance with an embodiment. Method 300 may be performed using a configuration tool having a sync layer as described herein. As shown, method 300 begins by auto-generating a multi-protocol mapping table based on the sync layer (implemented with the multi-protocol file discussed above, at block 310).

The resulting multi-protocol mapping table may be as shown in Table 2 below. Note that this ZAP-generated mapping between cluster and attribute codes need not be limited to this format and language, as in other implementations, other formats and languages can be used. As shown, Table 2 defines each row as a relationship between Matter and Zigbee cluster and attributes through their cluster and attribute codes (and note the acronyms are defined below).

TABLE 2

```
#define GENERATED_MULTI_PROTOCOL_ATTRIBUTES
{
  //MCC, MCMC, ZCC, ZCMC, MAC, MAMC, ZAC, ZAMC
  {0x004, 0x000, 0x007, 0x0000, 0x0001, 0x0000, 0x0003, 0x0000}
  .......
}
```

In an embodiment, the above mapping table may be defined as a new array of structures in the following way:

```
const
sl_zigbee_matter_af_multi_protocol_attribute_metad
ata_t generatedMultiProtocolAttributes[ ] =
GENERATED_MULTI_PROTOCOL_ATTRIBUTES;
```

In Table 2, the following abbreviations are used:

MCC: Matter cluster code
MCMC: Matter cluster mfg code
ZCC: Zigbee cluster code
ZCMC: Zigbee cluster mfg code
MAC: Matter attribute code
MAMC: Matter attribute mfg code
ZAC: Zigbee attribute code
ZAMC: Zigbee attribute mfg code During code generation, variations between the cluster and attribute specifications of ZCL and Data-Model can be considered. Some of the variations may include: data types of attributes may not be the same; attribute values, which may not be changeable due to different data types. Note that ZAP can generate attribute change callback methods for Zigbee and Matter. These callback functions can be tied to the mapping in Table 1, and provide an extension for unique operations based on distinct use cases. These methods can be called from other places as required by the application, and can be used by attribute reporting or attribute state subscriptions to sync the attributes across Zigbee and Matter in a multi-protocol application.

Still referring to FIG. 3, next at block 320, the multi-protocol mapping table may be provisioned into device code. Understand that this device code may be firmware for the device, which may include control code and the multiple protocol stacks. By way of this mapping table, the resulting device and its status may remain synchronized across the different protocols. Finally, at block 330, the device code may be stored into the device, e.g., in a non-volatile memory (e.g., a flash memory) and/or a dynamic memory (e.g., a random access memory (RAM)). For example, in the instance where this device code is stored in non-volatile memory, a bulk write operation may be performed during manufacture to write the device code into a plurality of devices concurrently.

Thus at this point a device such as a multi-protocol SoC includes a multi-protocol mapping table that is automatically generated as described herein. This table can be used to enable synchronization to be maintained across the multiple protocols. Understand that this wireless SoC, in turn, may be implemented into a variety of different IoT devices. While FIG. 1 above describes an IoT device implemented as a smart bulb, many other IoT devices can be provided with a multi-protocol SoC having a multi-protocol mapping table automatically generated and made part of application binary (or device code) as described herein. For example, other IoT devices that may be controlled within multiple wireless protocols can include sensors (e.g., motion/contact/light/temperature/pressure/flow/humidity), door locks, thermostats, pumps, sensors, windows, heaters, video players, speakers or so forth.

A provisioned IoT device as described herein can be onboarded into a given mesh network. Understand that there may be multiple mesh networks with which the device may communicate, e.g., with a different protocol for each mesh network, or a single mesh network may be provided that allows for multi-protocol communication within the network. Stated another way, depending on implementation there may be a single mesh network with different protocols available, or there may be multiple mesh networks, each having a different protocol.

Figure 4:
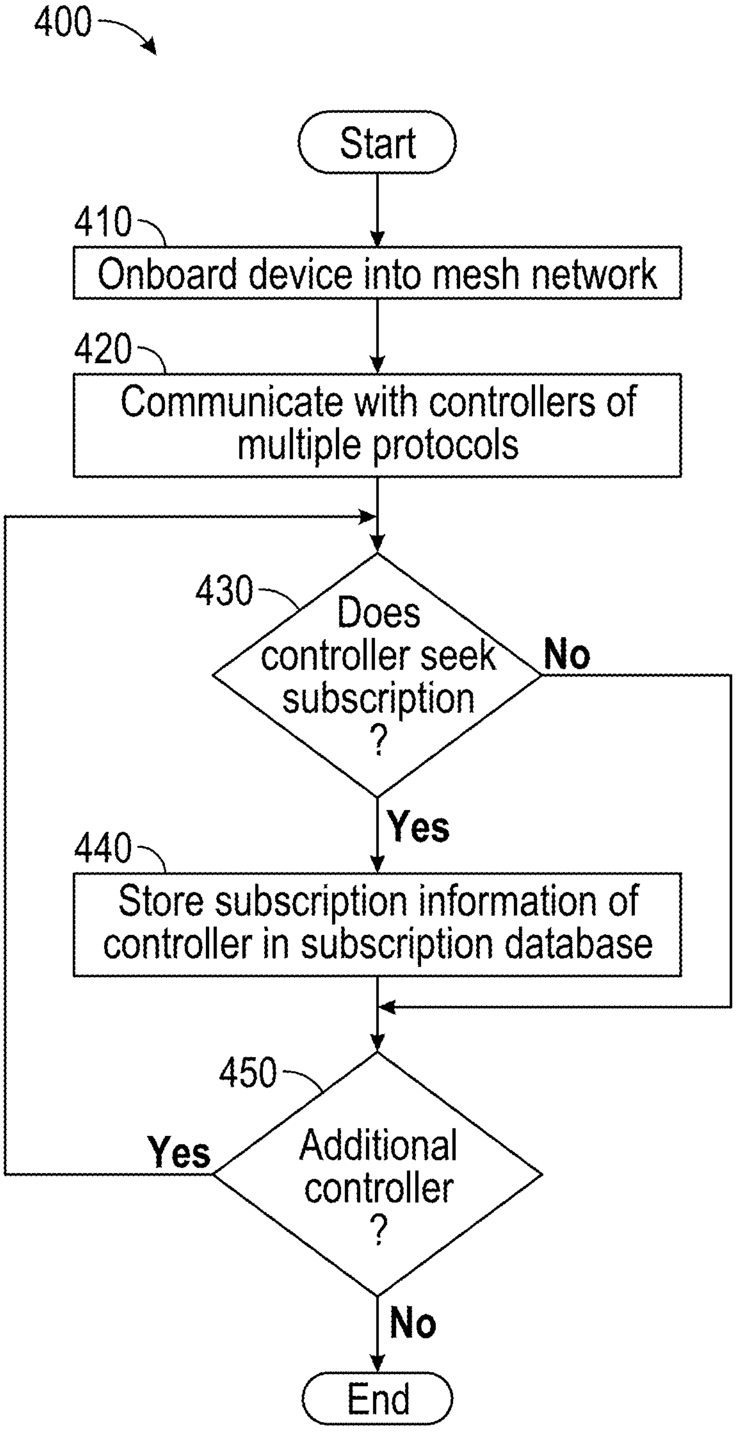
FIG. 4 is a flow diagram of an onboarding method in accordance with an embodiment.

Referring now to FIG. 4, shown is a flow diagram of an onboarding method in accordance with an embodiment. A network controller may perform method 400. As shown in FIG. 4, method 400 begins by onboarding the device into a mesh network (block 410). Such onboarding may include communicating with other nodes within the mesh network to identify the device's presence, its capabilities and so forth. Example information that may be communicated during the onboarding process includes a node identifier, device information, capability information or so forth. Understand that the capability information may include an indication that the device is capable of multi-protocol operation.

After onboarding, the IoT device can communicate with controllers of multiple protocols (block 420). For purposes of discussion, assume that these multiple controllers include a first controller implemented as a Zigbee controller and a second controller implemented as a Matter controller. In the context of a smart bulb, both of these controllers may be implemented as switches, either as physical or virtual switches.

Based on the communication with the controllers, it can be determined at diamond 430 whether a given controller seeks a subscription. Understand that this subscription enables the subscribing device to be apprised of the IoT device's operational status. If so, at block 440, the device may store subscription information of the controller in a subscription database. For example, the device may store a subscription database having multiple entries, where each entry is associated with a given controller or other device that seeks a subscription. The entry may include information about the device such as a node ID, as well as a given cluster, attribute and/or other states for which the subscriber seeks status updates. Such inclusion of entries within the subscriber database may occur for additional controllers, such as determined at diamond 450. Thus, at the conclusion of method 400, a device is provisioned into a network and is configured to identify one or more devices that are subscribed to it.

With a device configured as described herein and provisioned into a network that has controllers of multiple protocols, any given protocol can control the device. With embodiments having a multi-protocol mapping table automatically generated and configured into the device, synchronization between the different controllers can occur.

Figure 5:
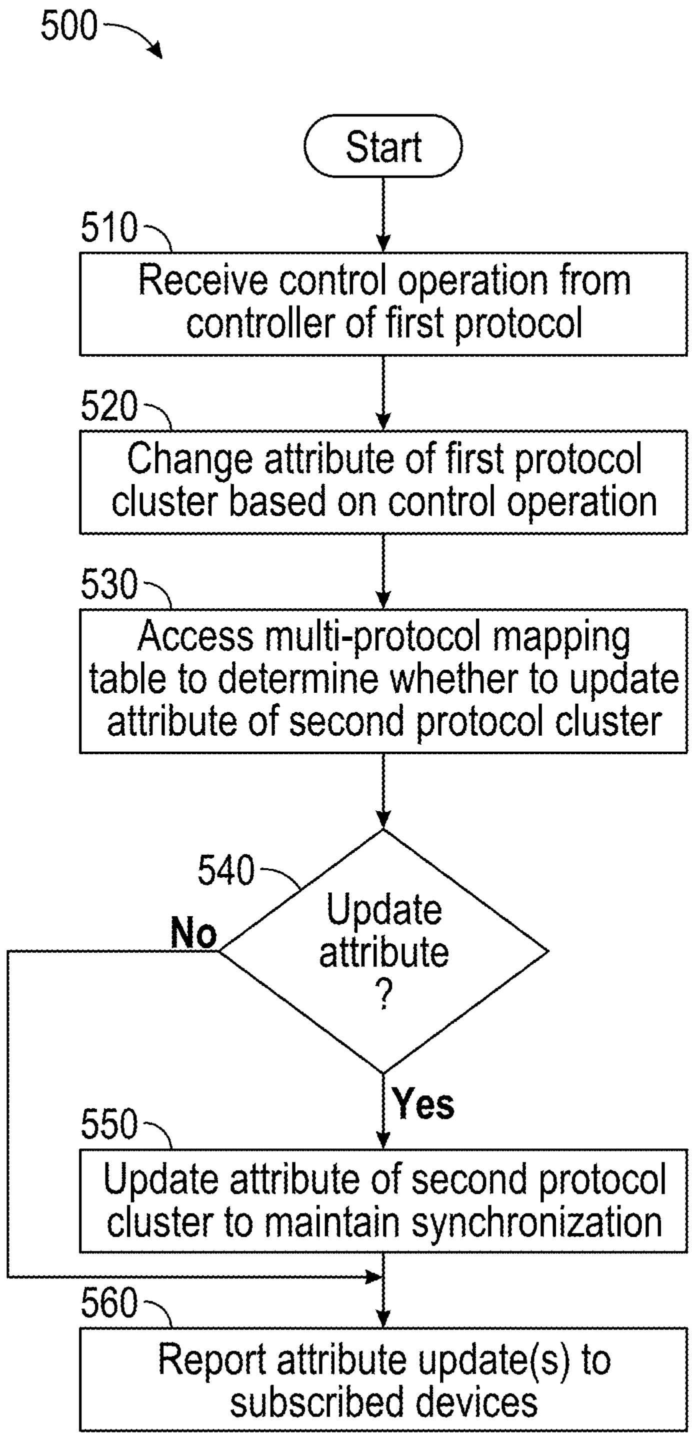
FIG. 5 is a flow diagram of a method in accordance with another embodiment.

Referring now to FIG. 5, shown is a flow diagram of a method in accordance with another embodiment. More specifically, method 500 is used to synchronize controllers of multiple protocols using a mapping table generated as described herein.

As shown, method 500 begins by receiving a control operation from a controller of a first protocol (block 510). For example, assume that a Zigbee controller sends a command to a smart bulb to turn the light on. In response to this command directed to an ON-OFF cluster of the smart bulb, the light turns on. Further as shown in FIG. 5, at block 520, an attribute of the first protocol cluster may be changed based on the control operation. For example, the attribute of this ON-OFF cluster may be changed from an off status to an on status.

Next, at block 530, the device accesses the multi-protocol mapping table (which may be auto-generated as described herein) to determine whether to update an attribute of the second protocol cluster. Based on the mapping, it is determined at diamond 540 whether to update the attribute. If so, at block 550, a corresponding attribute of the second protocol cluster (a corresponding ON-OFF cluster of the second protocol) may be updated to maintain synchronization, based on the information in the mapping table.

Control then passes to block 560 where the attribute updates can be reported to subscribed devices. To this end, the device may access entries within the subscription database to determine whether subscribers, such as controllers of other protocols, seek to be apprised of status updates to the subscribed devices. If so, the device sends these attribute updates. For example, sync layer attributes can be subscribed to changes by their remote controlling devices using attribute-reporting in Zigbee and events in Matter. Thus a change to a sync layer ZCL attribute in Zigbee leads to an update to the corresponding Data Model attribute in Matter, and a change to a sync layer Data Model attribute in Matter leads to an update to the corresponding ZCL Attribute in Zigbee. With embodiments, a Zigbee switch and a Matter switch are either both on or both off. Although shown at this high level in the embodiment of FIG. 5, many variations and alternatives are possible.

Referring now to Table 3, which is an example of metadata that may be stored in a structure in accordance with an embodiment. As shown, there is a single metadata entry for each attribute across all endpoints. This structure may be used to extract each entry in the array of Table 2 above.

TABLE 3

```
typedef struct {
        sl_matter_af_cluster_id_t zigbeeClusterId;
        sl_matter_af_cluster_id_t zigbeeMfgClusterId;
        sl_zigbee_af_cluster_id_t matterClusterId;
        sl_zigbee_af_cluster_id_t matterMfgClusterId;
        sl_zigbee_af_attribute_id_t zigbeeAttributeId;
        sl_zigbee_af_attribute_id_t zigbeeMfgAttributeId;
        sl_matter_af_attribute_id_t matterAttributeId;
        sl_matter_af_attribute_id_t matterMfgAttributeId;
}       sl_zigbee_matter_af_multi_protocol_attribute_metadata_t;
```

Referring now to Table 4, shown is an example of a Matter attribute change callback function, which may be code provided to enable a communication of an attribute change to a Matter controller based at least in part on the multi-protocol mapping table such as shown above. More specifically the code of Table 4 is called when an attribute in the Matter protocol is changed for a controlled device (e.g., the light of FIG. 1). In the code, it is checked whether the attribute is part of the multi-protocol sync layer. If so, then the corresponding Zigbee attribute is changed also. In this way, the controllers can be automatically updated (e.g., based on a subscription model discussed above in FIG. 5).

TABLE 4

```
void MatterPostAttributeChangeCallback(const
chip::app::ConcreteAttributePath & attributePath, uint8_t type,
uint16_t size,
          uint8_t * value)
{
   EndpointId endpoint = attributePath.mEndpointId;
   ClusterId clusterId    = attributePath.mClusterId;
   AttributeId attributeId = attributePath.mAttributeId;
   ChipLogProgress(Zcl, "Cluster callback: " ChipLogFormatMEI,
ChipLogValueMEI(clusterId));
   for (int i=0; i<generatedMultiProtocolAttributes.length; i++) {
      if (generatedMultiProtocolAttributes[i].matterClusterId ==
clusterId
         && generatedMultiProtocolAttributes[i].matterAttributeId ==
attributeId) {
         // Update zigbee DM
         sl_zigbee_af_write_attribute(endpoint, static_cast<uint8_t>(
clusterId), static_cast<uint16_t>(attributeId),
CLUSTER_MASK_SERVER, value, type);
      }
   }
}
```

Referring now to Table 5, shown is an example of a Zigbee attribute change callback function, which may be code provided to enable a communication of an attribute change to a Zigbee controller based at least in part on the multi-protocol mapping table such as shown above. Essentially, this code is the inverse of the code of Table 4. Here, this code is called when an attribute in the Zigbee protocol is changed for a controlled device. In the code, it is checked whether the attribute is part of the multi-protocol sync layer. If so, then the corresponding Matter attribute is changed also. In this way, the controllers can be automatically updated (e.g., based on the subscription model of FIG. 5).

TABLE 5

```
extern "C" void
sl_zigbee_af_post_attribute_change_cb(uint8_t endpoint,
        sl_zigbee_af_cluster_id_t
clusterId,
        sl_zigbee_af_attribute_id_t
attributeId,
        uint8_t mask,
        Uint16_t manufacturerCode
        Uint8_t type,
        Uint8_t size,
        Uint8_t* value)
{
  for (int i=0; i<generatedMultiProtocolAttributes.length; i++) {
    if (generatedMultiProtocolAttributes[I].zigbeeClusterId ==
clusterId
      && generatedMultiProtocolAttributes[I].zigbeeAttributeId ==
attributeId) {
      // Update Matter DM with external or non external
      emAfWriteAttributeExternal(endpoint, clusterId, attributeId,
Value, type);
    }
  }
}
```

With a sync layer in accordance with an embodiment, a mapping is established that can be updated over time as new features make device functionality better. Then using this sync layer to automatically generate a multi-protocol mapping table, can enable a multi-protocol device to operate seamlessly on multiple networks for the device's common features across the networks. Still further, the information in the mapping table enables controllers of the multi-protocol device on the different networks to be in sync. In contrast, existing techniques require hardcoded mapping of each cluster attribute between the networks, preventing scalability and update capabilities, and preventing an easy way for controllers to seek subscriptions.

Figure 6:
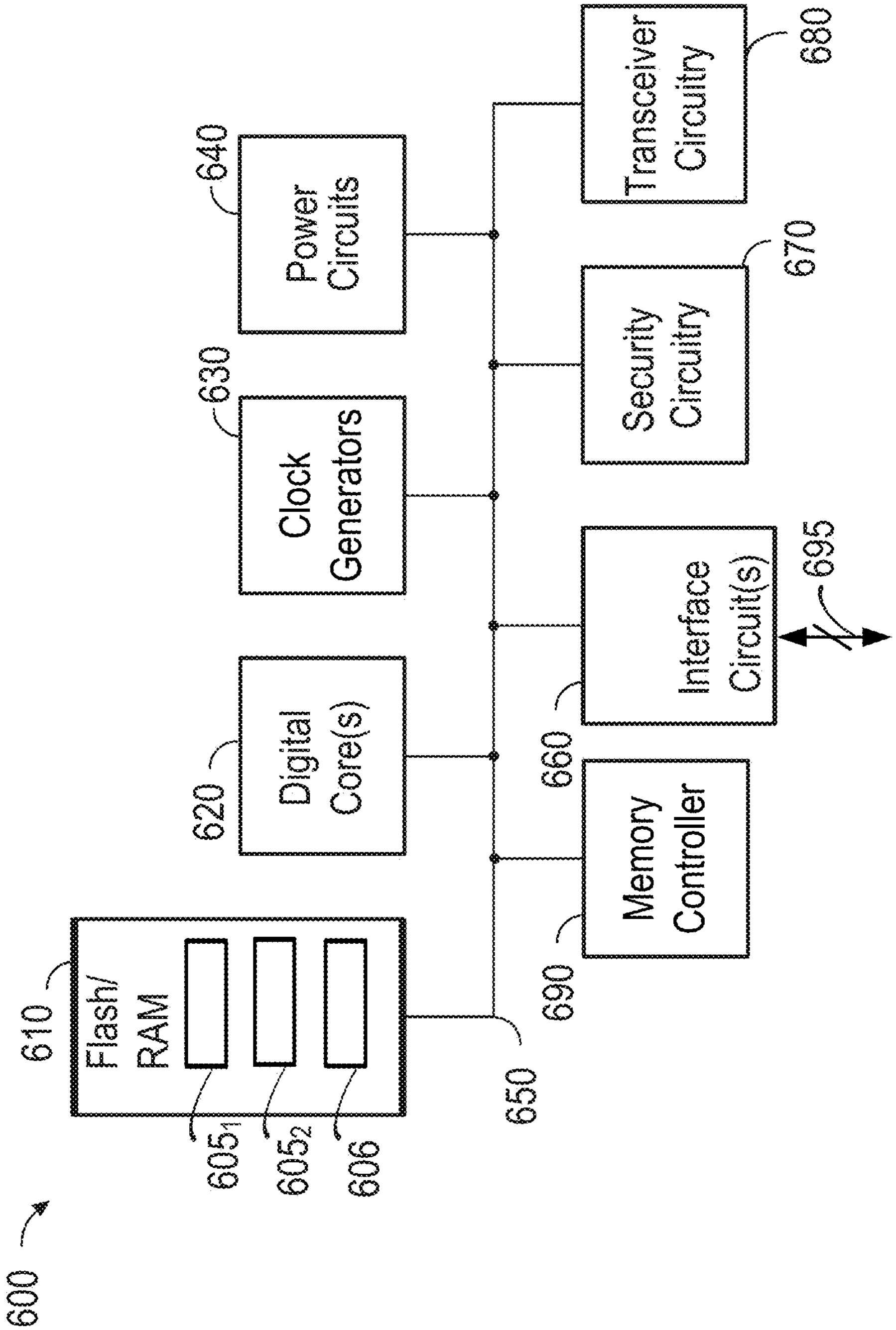
FIG. 6 is a block diagram of a representative integrated circuit in accordance with an embodiment.

Referring now to FIG. 6, shown is a block diagram of a representative integrated circuit 600 that includes a multi-protocol mapping table that is auto-generated as described herein. In the embodiment shown in FIG. 6, integrated circuit 600 may be, e.g., a multi-mode wireless transceiver that may operate according to one or more wireless protocols (e.g., Matter and Zigbee, among others) or other device that can be used in a variety of use cases. In one or more embodiments, the circuitry of integrated circuit 600 shown in FIG. 6 may be implemented on a single semiconductor die or implemented on separate dies for wireless communication, MCU compute, external flash and/or other IP blocks needed to perform the gateway IoT end device functionalities.

Integrated circuit 600 may be included in a range of devices, but for purposes of discussion, it may be incorporated into an IoT device as described herein. In the embodiment shown, integrated circuit 600 includes a memory system 610 which in an embodiment may include volatile storage, such as RAM and non-volatile memory such as a flash memory. The flash memory is a non-transitory storage medium that can store instructions and data. In embodiments, this storage may store code 6051 for a Matter protocol stack and code 6052 for a Zigbee protocol stack, as described herein. As further shown, memory 610 includes a multi-protocol mapping table 606, which may be auto-generated by a configuration tool as described herein. Integrated circuit 600 also may include a memory controller 690.

Memory system 610 couples via a bus 650 to one or more digital cores 620, which may include one or more cores and/or microcontrollers that act as processing units of the integrated circuit, and which may execute an IoT end device application to control circuitry of the IoT device. In turn, digital cores 620 may couple to clock generators 630 which may provide one or more phase locked loops or other clock generator circuitry to generate various clocks for use by circuitry of the IC.

As further illustrated, IC 600 further includes power circuitry 640. Additional circuitry may be present depending on particular implementation to provide various functionality and interaction with external devices. Such circuitry may include interface circuitry 660 which provides a digital communication interface with additional circuitry (such as a host MPU of a gateway to couple to IC 600 via a link 695). IC 600 also may include security circuitry 670 to perform wireless security techniques.

In addition, as shown in FIG. 6, transceiver circuitry 680 may be provided to enable transmission and reception of wireless signals, e.g., according to one or more of a local area or wide area wireless communication scheme, such as Matter, Zigbee, Bluetooth, IEEE 802.11, IEEE 802.15.4, cellular communication or so forth. Understand while shown with this high level view, many variations and alternatives are possible.

Figure 7:
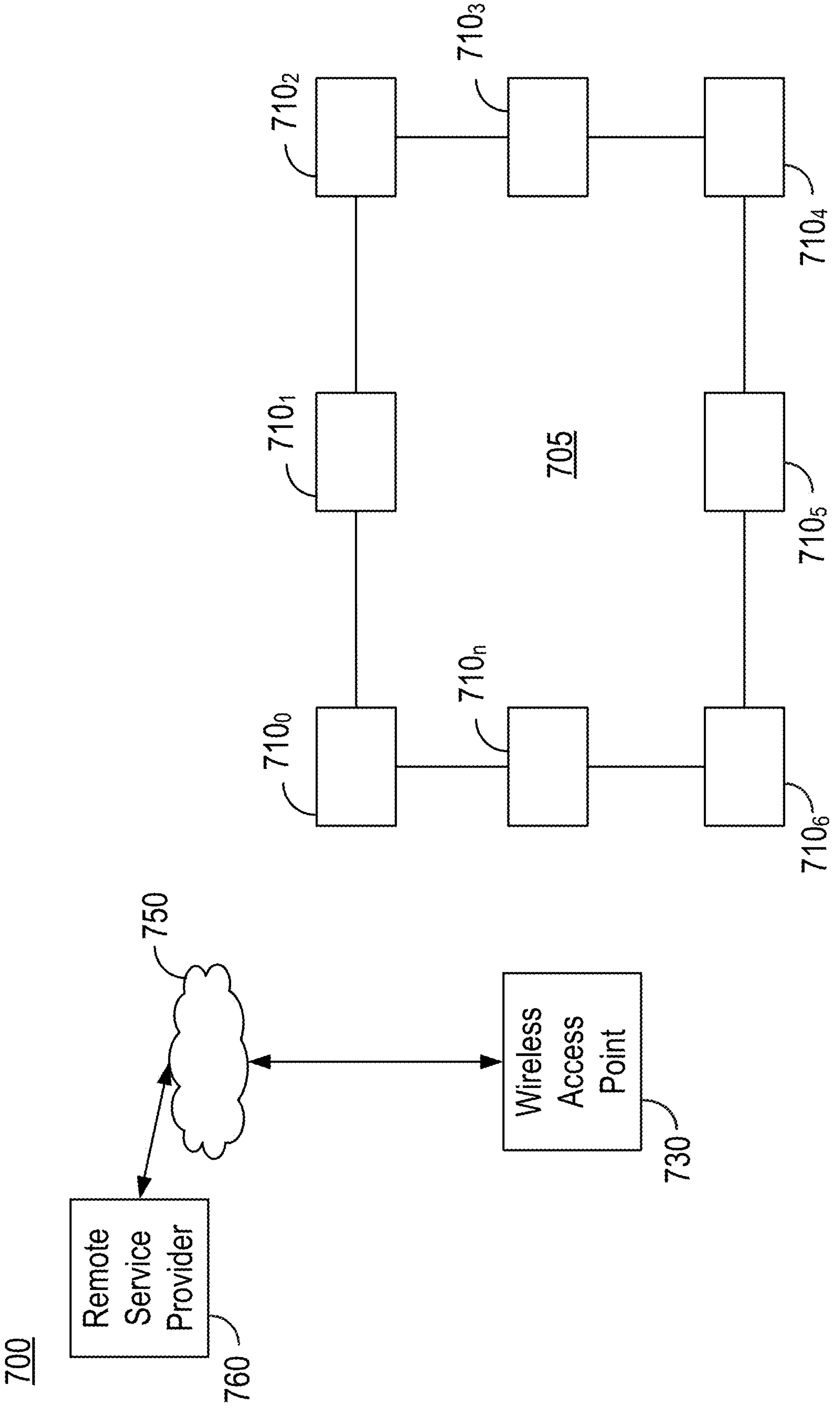
FIG. 7 is a high level diagram of a network in accordance with an embodiment.

ICs such as described herein may be implemented in a variety of different devices as described above. Referring now to FIG. 7, shown is a high level diagram of a network in accordance with an embodiment. As shown in FIG. 7, a network 700 includes a variety of devices, including IoT devices which may include multi-protocol mapping tables as described herein, access points and remote service providers.

In the embodiment of FIG. 7, a wireless mesh network 705 is present, e.g., in a building having multiple wireless devices 7100-*n*. As shown, wireless devices 710, which may be representative versions of device 100 of FIG. 1, couple to an access point 730 that in turn communicates with a remote service provider 760 via a wide area network 750, e.g., the Internet. Understand while shown at this high level in the embodiment of FIG. 7, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:

for a first endpoint of a first wireless protocol and a first endpoint of a second wireless protocol, identifying a plurality of common clusters and a plurality of common attributes;

generating a synchronization (sync) layer based at least in part on the plurality of common clusters and the plurality of common attributes; and storing the sync layer as a multi-protocol file in at least one non-transitory storage medium, the at least one non-transitory storage medium accessible to a configuration tool.

2. The method of claim 1, further comprising generating the sync layer comprising a plurality of entries, each of the plurality of entries comprising:

a cluster identifier for a common cluster of the first wireless protocol and the second wireless protocol and, associated with the cluster identifier, a common code for the first wireless protocol and the second wireless protocol; and at least one attribute identifier for a common attribute of the first wireless protocol and the second wireless protocol and, associated with the at least one attribute identifier, a common code for the first wireless protocol and the second wireless protocol.

3. The method of claim 1, further comprising storing the multi-protocol file as a JavaScript Object Notation (json) file.

4. The method of claim 1, further comprising generating the sync layer using the configuration tool based at least in part on an identification of a multi-protocol application for a wireless device to communicate using the first wireless protocol and the second wireless protocol.

5. The method of claim 4, further comprising accessing the multi-protocol file with the configuration tool and using the multi-protocol file to create a multi-protocol mapping table, the multi-protocol mapping table for causing one or more attributes of the first wireless protocol to be in synchronization with one or more corresponding attributes of the second wireless protocol during operation of the wireless device.

6. The method of claim 5, wherein creating the multi-protocol mapping table comprises auto-generating the multi-protocol mapping table in the configuration tool using the multi-protocol file.

7. The method of claim 5, further comprising associating the multi-protocol mapping table with device code of the wireless device.

8. The method of claim 7, further comprising storing the device code comprising the multi-protocol mapping table in a non-volatile storage medium of the wireless device.

9. The method of claim 5, further comprising in response to an update to a state of a first attribute of the first wireless protocol, synchronizing a state of a first attribute of the second wireless protocol to correspond to the updated state of the first attribute of the first wireless protocol using the multi-protocol mapping table.

10. The method of claim 9, further comprising communicating the update to the state of the first attribute of the second wireless protocol to a controller of the second wireless protocol according to an entry in a subscription database of the wireless device.

11. A computer readable storage medium comprising instructions that when executed cause a system to perform a method comprising:

for a first endpoint of a first wireless protocol and a first endpoint of a second wireless protocol, identifying a plurality of common clusters and a plurality of common attributes;

generating a synchronization (sync) layer based at least in part on the plurality of common clusters and the plurality of common attributes; and storing the sync layer as a multi-protocol file in at least one non-transitory storage medium, the at least one non-transitory storage medium accessible to a configuration tool.

12. The computer readable storage medium of claim 11, wherein the method further comprises generating the sync layer comprising a plurality of entries, each of the plurality of entries comprising:

a cluster identifier for a common cluster of the first wireless protocol and the second wireless protocol and, associated with the cluster identifier, a common code for the first wireless protocol and the second wireless protocol; and at least one attribute identifier for a common attribute of the first wireless protocol and the second wireless protocol and, associated with the at least one attribute identifier, a common code for the first wireless protocol and the second wireless protocol.

13. The computer readable storage medium of claim 11, wherein the method further comprises generating the sync layer using the configuration tool based at least in part on an identification of a multi-protocol application for a wireless device to communicate using the first wireless protocol and the second wireless protocol.

14. The computer readable storage medium of claim 13, wherein the method further comprises accessing the multi-protocol file with the configuration tool and using the multi-protocol file to create a multi-protocol mapping table, the multi-protocol mapping table for causing one or more attributes of the first wireless protocol to be in synchronization with one or more corresponding attributes of the second wireless protocol during operation of the wireless device.

15. The computer readable storage medium of claim 14, wherein the method further comprises auto-generating the multi-protocol mapping table in the configuration tool using the multi-protocol file.

16. A wireless device comprising:

at least one circuit to perform an operation under control of at least one of a first controller of a first wireless protocol and a second controller of a second wireless protocol; and an integrated circuit coupled to the at least one circuit, the integrated circuit comprising:

at least one transceiver to communicate with the first controller via the first wireless protocol and the second controller via the second wireless protocol;

a processor to execute instructions; and a non-volatile storage coupled to the processor, the non-volatile storage to store a multi-protocol mapping table that associates common clusters of the first wireless protocol and the second wireless protocol and common attributes of the first wireless protocol and the second wireless protocol, the multi-protocol mapping table auto-generated by a configurator.

17. The wireless device of claim 16, wherein the wireless device is to access the multi-protocol mapping table to identify a first attribute of the second wireless protocol to update based on an update to a corresponding first attribute of the first wireless protocol.

18. The wireless device of claim 17, further comprising a memory coupled to the non-volatile storage, the memory to store a subscription database, wherein in response to the update to the first attribute of the second wireless protocol, the wireless device is to communicate a status update regarding the updated first attribute of the second wireless protocol to the second controller.

19. The wireless device of claim 18, wherein the processor is to execute an attribute change callback function to cause the status update regarding the updated first attribute of the second wireless protocol to be communicated to the second controller.

20. The wireless device of claim 16, wherein the at least one circuit comprises at least one light emitting diode, the processor to control the at least one light emitting diode in response to a command from the first controller.

* * * * *